United States Patent
Gaither et al.

(10) Patent No.: US 7,774,551 B2
(45) Date of Patent: Aug. 10, 2010

(54) HIERARCHICAL CACHE COHERENCE DIRECTORY STRUCTURE

(75) Inventors: Blaine D. Gaither, Ft. Collins, CO (US); Verna Knapp, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 589 days.

(21) Appl. No.: 11/544,690

(22) Filed: Oct. 6, 2006

(65) Prior Publication Data

US 2008/0086601 A1 Apr. 10, 2008

(51) Int. Cl.
*G06F 12/00* (2006.01)

(52) U.S. Cl. .............. 711/141; 711/122; 711/E12.027

(58) Field of Classification Search .......... 711/141
See application file for complete search history.

(56) References Cited

U.S. PATENT DOCUMENTS

| | | | |
|---|---|---|---|
| 5,752,258 A * | 5/1998 | Guzovskiy et al. | 711/120 |
| 6,449,700 B2 * | 9/2002 | Hagersten et al. | 711/152 |
| 2002/0087778 A1 * | 7/2002 | Schoinas | 711/1 |
| 2003/0005237 A1 | 1/2003 | Dhong et al. | |
| 2003/0200397 A1 * | 10/2003 | McAllister et al. | 711/141 |
| 2004/0123046 A1 | 6/2004 | Hum et al. | |
| 2005/0160230 A1 | 7/2005 | Doren et al. | |
| 2005/0160232 A1 | 7/2005 | Tierney et al. | |
| 2005/0160430 A1 * | 7/2005 | Steely et al. | 719/310 |

* cited by examiner

*Primary Examiner*—Reginald G Bragdon
*Assistant Examiner*—Aracelis Ruiz

(57) ABSTRACT

A method for maintaining cache coherence comprises coordinating operations among a plurality of processors distributed among a plurality of nodes coupled by an interconnect fabric and managing cache coherence in a plurality of memory directories respectively associated with the processor plurality in combination with a node controller directory cache associated with a node controller coupled between the processor plurality and the interconnect fabric. The method further comprises maintaining memory coherence directory information comprising identifying processors within a node in a first portion of bits of a memory directory entry coupled to an associated processor in the node and identifying subsets of processors external to the node in the system in a second portion of bits.

23 Claims, 11 Drawing Sheets

US 7,774,551 B2

HIERARCHICAL CACHE COHERENCE DIRECTORY STRUCTURE

BACKGROUND

Multi-processor systems include two or more computer processors that communicate typically over a bus or a general interconnect network. Individual processors may include a memory cache or cache store that is separate from a main system memory that the individual processors can access. Cache memory connected to the processors can enable faster access to data than through direct access from the main system memory. Caches improve performance by reducing latency associated with accessing data on cache hits and by reducing the number of requests to system memory. Caches can be cascaded in a hierarchy. A cache can serve a group of caches, a group of processors, or a single processor.

Coherence protocols can ensure that a processor reading a memory location actually receives correct or true data. Coherence protocols also ensure that system state remains deterministic by supplying rules enabling a single processor to modify any part of the data at one time. If coherence protocols are faulty, inconsistent copies of data can be generated.

Two main types of cache coherence protocols exist including directory-based coherence protocol and broadcast-based coherence protocol. The directory-based coherence protocol associates tags with each line in memory. A broadcast based coherence protocol also associates tags with each memory line. The caches contain tags associated with each memory line in the cache. The tags contain state information indicating ownership or usage of the memory line. The state information enables tracking of how a memory line is shared. Usage information can describe whether the memory line is cached exclusively in a particular processor's cache, whether the memory line is shared by a number of processors, and/or whether the memory line is currently cached by any processor.

A broadcast-based coherence protocol does not use tags in memory but rather has each of the caches snoop broadcast requests to the system. Each cache contains tags associated with each memory line that has been cached. If the cache does not contain a memory line and a request is made, the other caches are snooped to obtain the line in the proper state. Specifically, if a request is made that requires private or exclusive access to a line the snoop instructs all other caches to purge the line and if the line has been modified, the cache holding the modified line must write the line to the memory and/or the requesting cache. If the line is not held modified in any cache and the line is in a cache, the line may be supplied by that cache or may be obtained from memory. If no cache has a copy of the line, the line is supplied from memory.

SUMMARY

An embodiment of method for maintaining cache coherence comprises coordinating operations among a plurality of processors distributed among a plurality of nodes coupled by an interconnect fabric and managing cache coherence in a plurality of memory directories respectively associated with the processor plurality in combination with a node controller directory cache associated with a node controller coupled between the processor plurality and the interconnect fabric. The method further comprises maintaining memory coherence directory information comprising identifying processors within a node in a first portion of bits of a memory directory entry coupled to an associated processor in the node and identifying subsets of processors external to the node in the system in a second portion of bits.

BRIEF DESCRIPTION OF THE DRAWINGS

Embodiments of the invention relating to both structure and method of operation may best be understood by referring to the following description and accompanying drawings.

DETAILED DESCRIPTION

A small directory cache can be used to augment a memory directory or a memory directory cache built into a computer component to increase resolution of coherence information in a system with multiple components. In typically embodiments, the components can include central processing units (CPUs), controllers, signal processors, input/output (I/O) controllers, memory caches, memory controllers such as free-standing memory controllers, and the like.

System components supplied by various manufacturers are typically constructed for mass markets. The components and internal resources are typically optimized for small configurations that represent the bulk of product volume. Systems are generally optimized for two, four, or eight directly-connected CPU components as well as associated Input/Output (I/O) components. Such optimization can create difficulty in supporting sufficient resources for a large computer platform, for example a platform that supports many (32, 64, or more) CPUs.

Base components of a system can contain several CPU cores and a memory controller. For example, a Hewlett-Packard Superdome server cell can have a built-in memory controller. In Superdome systems, memory coherence is maintained by embedding coherence directory information in combination with data lines stored in Dynamic Random Access Memory (DRAM). Some systems may also implement a directory cache to accelerate look-ups and protect cores and busses from excessive snoop traffic.

In a directory-based coherence scheme, the number of bits are limited that can be used to identify a core that owns a line or cores that share a line. A system can be constructed with more cores than can be uniquely identified by grouping multiple cores and then snooping groups of cores. Bus snooping, which may be called intercepting or bus sniffing, can be used in distributed shared memory systems and multiprocessors to attain cache coherence. Typically, each cache controller monitors a bus and waits for broadcasts that cause invalidation or state change of a cache line. An example of a state change may be demotion of a line from exclusive access to shared access, or request that the line be shared, such as when the line is privately owned by a single cache and another cache calls for the data to have read access. Snooping results in extra traffic for both requests and responses. Typically, a requester waits for a response, which can be inefficient and lead to long waiting times if variation in fabric latency is large. Because the number of snoops and recalls in flight may be high, resources and complexity to track handling can be large.

The illustrative structures and techniques can be configured to reduce recall and snoop traffic, enabling greater scalability. By reducing the number of snoops in the system, latency can be reduced as well as load on the interconnect fabric. By reducing traffic in the system, overhead and tracking of the traffic is reduced so buffers can be small.

Figure 1A:
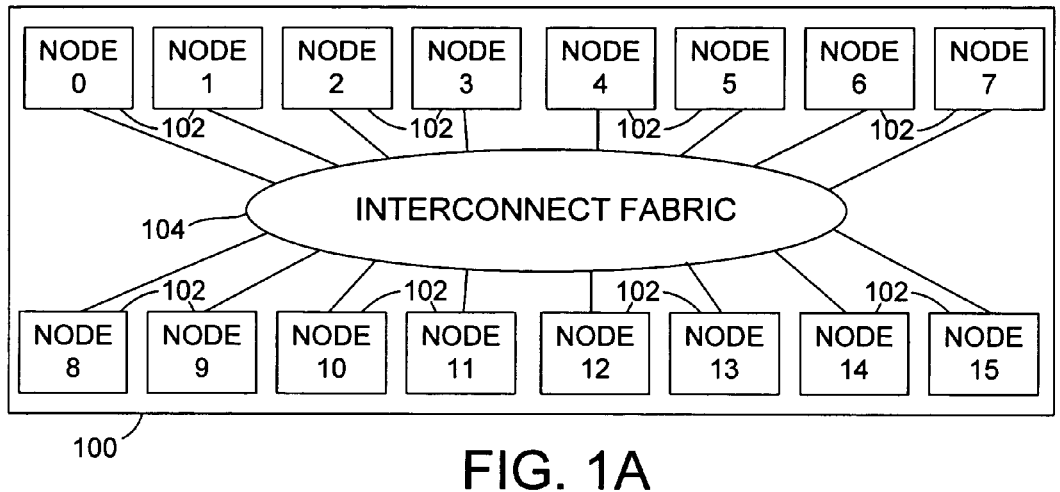
FIGS. 1A and 1B are schematic block diagrams that illustrate an embodiment of a system implementing a hierarchical cache coherence directory structure.
Figure 1B:
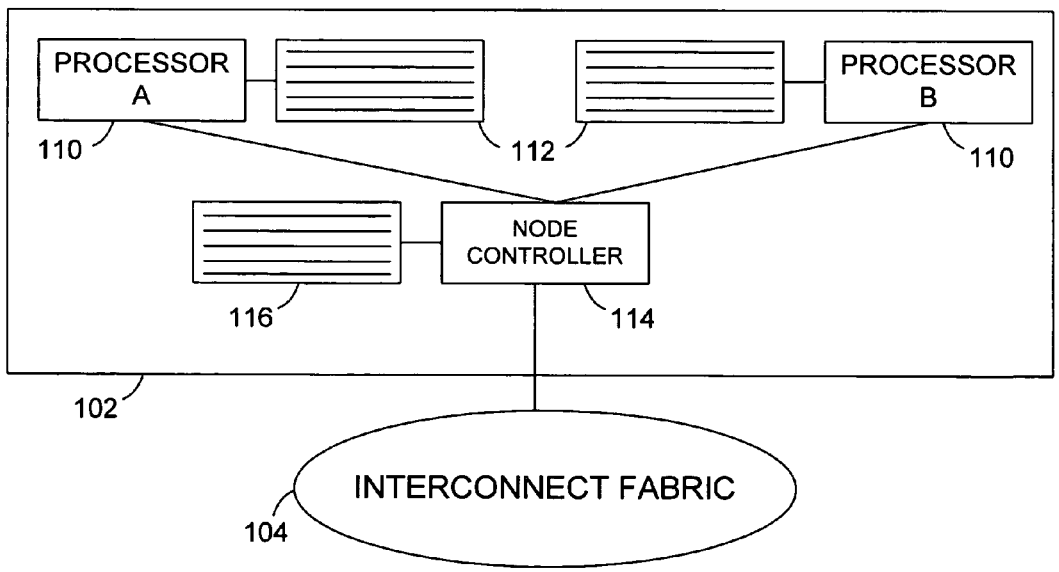

Referring to FIGS. 1A and 1B, schematic block diagrams illustrate an embodiment of a system 100 that implements an hierarchical cache coherence directory structure. The system 100, shown in FIG. 1A, comprises a plurality of nodes 102 coupled by an interconnect fabric 104. One or more of the nodes 102, shown in FIG. 1B, comprise a plurality of processors 110 respectively coupled to an associated plurality of memory directories 112 and a node controller 114 coupled to an associated node controller directory cache 116 and coupled between the processors 110 and the interconnect fabric 104. The memory directories 112 and the node controller directory cache 116 are configured in combination to maintain memory coherence directory information.

The directory cache 116 typically contains a part of a directory. A directory 112 contains tags associated with memory lines that identify the true state of each line in memory. The memory directory 112 associated with a processor 110 is a directory of that portion of memory attached to the processor socket. The directory 112 may or may not contain information relating to the precise list of caches that contain each line, but do have to identify a superset of the caches containing each line. In contrast, a regular cache contains memory lines in combination with tags and usually does not track which other cache or caches own the line. In the illustrative arrangement, the processor (or CPU) sockets have memory attached although the directory is associated with the memory and not with the processor. The processor or CPU operates at least in part as a socket memory controller.

As depicted in FIG. 1B, a node 102 of the multiple nodes in the system 100 has fewer processors 110 than the number of processors that can be uniquely identified by bits in the element of the memory directory 112 for the associated processors 110. The additional bits in the memory directory entry beyond the bits for identifying local processors are used to identify subsets of processors external to the node 102.

In some embodiments, the illustrative structure and technique can be implemented by modifications to operation of a directory cache which can be embedded in a circuit such as a chip-set "glue" chip used to connect several cells, which can also be called nodes, and enable formation of a system with many processors, for example 32 or more cells. The technique facilitates efficient operation and avoids the conventional technique of simply snooping all additional processor sockets.

The node controller directory cache 116 and "on-cell" memory directories 112 are operated in combination to increase efficiency and reduce the amount of snooping for attaining cache coherence. In an example implementation, a glue chip can interface to both a local or home cell (node 102) and a fabric 104 connecting to additional cells 102.

A controller such as a processor 110, the node controller 114, or other logic can be configured to maintain memory coherence by embedding coherence directory information in combination with data lines in a memory. The multiple memory directories 112 and the node controller directory cache 116 are configured in combination for facilitating look-up operations, and protecting the processor plurality and busses from excessive snoop traffic. The illustrative configuration also enables externally-generated requests for information from a local node's memories which are held in exclusive state on a remote node to not be delayed by having to read a tag out of the memory directory on the node, but can use the directory cache to determine which socket for sockets have the line of interest.

Figure 2A:
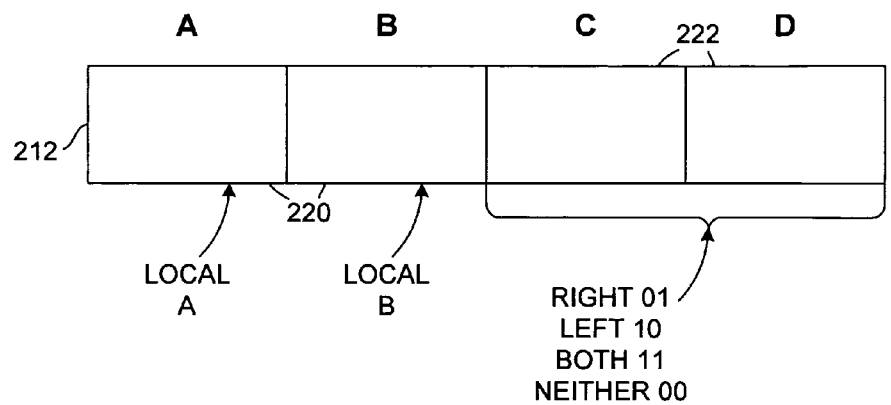
FIGS. 2A, 2B, and 2C are graphics respectively showing bit fields for a memory directory entry, a node controller directory cache entry for a local node, and a node controller directory cache entry for a remote node.

Referring to FIG. 2A, a data structure graphic depicts a memory directory entry 212 of a memory directory 112 that is coupled to an associated processor 110 in a node 102. The memory directory entry 212 comprises a first portion 220 of bits that identify processors within the node and a second portion 222 of bits that identify subsets of processors external to the node in the system. In a typical four-socket configuration, second portion bits 222 would indicate another two CPU sockets. The illustrative system uses the second portion bits 222 to identify subsets of the sockets that are external to the node.

A controller such as a processor 110 or other executable logic can be configured for executing a directory-based coherence scheme using bits 220, 222 in memory directory entries to identify processors that own a line and/or processors that share a line.

In some embodiments, a controller 110 can be configured to manage the second bit portion 220 in the memory directory entry 212 to access more processors than can be uniquely identified by the memory directory entry bits. The controller 110 can be configured for snooping at least one processor identified by a bit in the second portion 222.

In an illustrative embodiment, the second portion 222 of bits that identify subsets of processors external to a local node can be divided into at least two groups. A controller can be configured to respond to a remote request from a processor in one of the groups by making a request using an identifier specific to the group. The controller can respond to a recall request for a primary identifier by snooping a first group of the two or more groups alone and respond to a recall request for a non-primary identifier by snooping a group of the two or more groups other than the first group.

A controller, for example a logic associated with a processor 110 and/or the node controller 114 or other executable logic, can also be configured for managing the node controller directory cache 116 to track coherence information in the system 100 that is larger than a directory supported by a processor local tag structure. The controller tracks usage of processors in the processor subset external to the node and identifies processors in the processor subset that have permission to access lines.

A directory cache 116, for example which may be implemented on a glue chip, can be used to track coherence information in a system larger than that directly supported by the cell's local tag structure. The directory cache 116 tracks external usage of the cell's memory, tracking which processor cores that are external to the home cell have permission to access particular lines on the cells. The directory cache 116 may be inclusive or exclusive of the caches on the external cells. If a recall request is issued by any core, including those cores on the home cell, the directory cache 116 is capable of issuing a recall to the cores that have a line dirty or shared.

In many example deployments, the home cell may only be able to track ownership for up to 32 processor sockets (multiple processor cores may be on or in a single socket) and for shared lines track the processor cores that share lines in eight groups. If a shared line is to be recalled, one eighth of the cores are snooped.

Cost reasons may prohibit inclusion of sufficient directory coherence bits to uniquely identify cores or cells that own a line, or to uniquely identify the particular cores that may share copies of a line. For example, a directory may be able to track the particular owner of a line but may only be able to track eight groups of lines that share the cache line.

Because the number of processor cores deployed in a node or cell is less than the number of cells that the home cell can track, the illustrative technique for handling memory directories 112 and the directory cache 116 enables tracking of more sharers and/or owners.

Specifically, the illustrative technique for managing the memory directories 112 and the directory cache 116 uses otherwise unused core identifiers (IDs) to enable additional differentiation within the directory cache 116 of a glue chip.

The system 100 comprises a plurality of nodes 102 connected by an interconnect fabric 104. In the illustrative system 100, the individual node 102 is depicted containing two processors 110, although in other embodiments any suitable number of processors 110 may be implemented in a node 102. The individual processors 110 are connected to the interconnect fabric 104. The individual processors 110 internally have a memory directory for tracking in a directory-based coherence scheme.

Base components for multiprocessor systems generally support a limited number of processor connections. For example, one typical design supports a four-socket system and thus only tracks coherence of four items, as shown in the memory directory entry 212 depicted in FIG. 2A. The system 100 to be supported is much larger than the four supported targets, for example the sixteen nodes 102 shown in FIG. 1A. A system implementing conventional coherence tracking would engage in a substantial amount of snooping to track the interconnected nodes and processors. Accordingly, the structures and techniques illustrated herein for the system 100 introduce an additional directory level that is implemented on the node controller 114, shown in FIG. 2B as a node controller directory cache entry 216 for a local processor, in combination with a method for using the node controller directory cache 116 in combination with the memory directories 112 to enable addressing of the large number of nodes 110.

Due to the limited number of bits in the memory directory entries 212, the node controller 114 can only identify a limited number, for example eight, of unique groups of processors. Therefore, for 16, 32, or 64 processor systems, the directory is insufficient for tracking activity on more than eight nodes without the overhead of multiple redundant snoops.

Accordingly, the illustrative structures and techniques are adapted to substantially reduce the number of snoops in maintaining cache coherence. The illustrative memory directory entry 212 is arranged by allocating bits A and B to identify processors A and B in the node, and allocating the remaining bits C and D to identify groups of remote processors. The memory directories 112 and the node controller directory cache 116 are arranged so that the directory cache 116 for the node controller 114 tracks which group of the eight node groups has a copy of a line. In various embodiments, the node controller directory cache 116 can have additional bits that reflect further aspects of operation. For example, a bit in the directory cache 116 can be allocated to identify whether a line is held modified so that, instead of using the eight bits in a directory cache entry 216 as a bit vector, the node controller 114 uses a binary number to represent a processor or node that actually has ownership of a line since only one entity can own the line. The illustrative structures and techniques are configured to enable the node controller directory cache entries 216 to overcome limitations in density and enable the on-memory directories 112 to attain increased resolution for shared items.

Processors A and B 110 are connected to the node controller 114 and can also be directly interconnected to each other. Processors A and B 110 are also respectively connected to memory directories A and B 112, for example in a manner that each processor 110 has a directory entry 212 for every memory location associated with the socket. The illustrative directory memory entry 212 has four entries with two of the entries used to indicate whether the processor 110, for example processor A, directly coupled to and associated with the memory directory 112 containing the directory entry 212 has a copy of a line, and whether the other processor 110 in the node 102, for example processor B, has a copy of the line. Accordingly, real bits A and B, represent that the local processors in the node have copies of the line. Bits C and D, which would otherwise be unused in a four-socket system implemented with only two processors, are accessed by the node controller 114 and operated upon in compliance with bus protocols. In the illustrative technique, the node controller 114 uses bits C and D to divide the real node controller directory entry and redefine directory cache entries 216 to express multiple meanings. When an external node controller makes a request of the processor directed to a specific memory directory entry for a memory access, the processor associated with the memory directory entry functions as either processor C or processor D depending on whether the request is made from a node on the left, specifically nodes 0-7, or from a node on the right, specifically nodes 8-15. Note that in other embodiments, groups of nodes may be otherwise defined such as, for example, two groups identified as odd and even, or nodes separated into more than two groups.

The node controller 114 can operate to ensure that both the node making a request and the node that receives the request have information identifying both node numbers. Thus a node requesting setting of a shared bit asserts the shared bit for the requesting node and for the node that receives the request. Both the node making the request and the node that receives the request have copies of the shared line that can be accessible to other nodes and thus have both bit C and bit D set in appropriate memory directory entries. Both the requesting node and the recipient node will have copies of the associated line, and have both bit C and bit D set in the associated memory directory entries. That line is accessible to another node. In an example of subsequent operation, the processor in the node indicated by the set bit C can issue a snoop which passes through the node controller. The node controller identifies the source of the snoop, looks up the line in the node controller directory cache entry, and determines the target processor of the recall accordingly. If both bit C and bit D are set in the memory directory entry of the node originating the snoop, then the node controller issues a snoop of the node indicated by the set bit D. The operation increases the granularity of recall while reducing the amount of snooping of cells or nodes.

If the processor already has the line in shared mode and permits sharing of the line, the processor will not snoop. Another processor in that node might snoop and the snoop would detect that the node already has the line and would grant access. If the subsequent operation is a request for exclusive access, then all owning nodes are snooped, at a minimum.

A processor 110 and the node controller 114 operate in cooperation so that, when a remote node controller makes a request, the node controller 114 looks up data in the node controller directory cache 116 and then, using information about whether the node making a request is indicated by bit C or bit D in the memory directory entry, the local processor 100 can issue a recall based on the request. The node controller

114 makes recalls from the node group designated by bit C or bit D in the memory directory entry wherein the designation by bits C and D add particular meaning to the eight bits in the directory cache entry. The illustrative grouping of nodes and processors enables a request of fewer than the whole set, substantially reducing the amount of snooping.

Figure 2B:
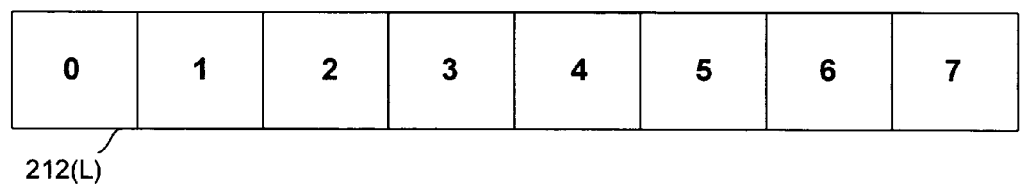
Figure 2C:
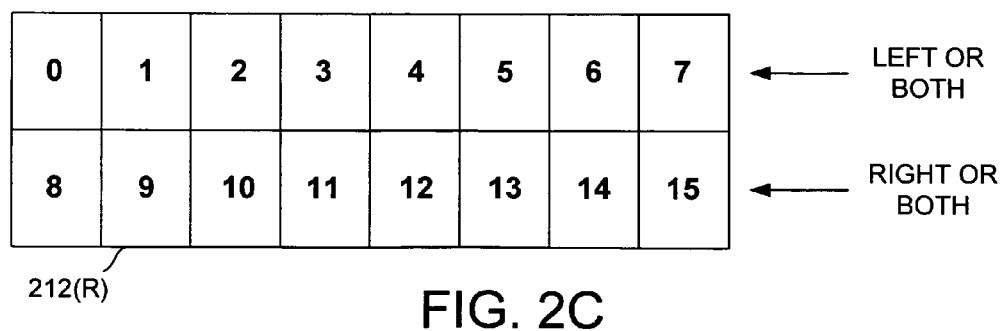

The node controller directory cache entry for a local processor 216(L) in a node is shown in FIG. 2B and depicts eight bits that encode information including information for usage in maintaining cache coherence. The node controller directory cache entry caches tags and ownership state of the line for a memory in the node controller and may be inclusive or not inclusive of information in the memory in various embodiments or configurations. The node controller directory cache entry for a remote processor or node 216(R) is shown in FIG. 2C and illustrates sixteen bits including eight bits encoding information for relating to the C bit in the memory directory entry 212 and eight bits encoding information relating to the D bit in the memory directory entry 212.

The illustrative structure and technique redefines operation of the memory directory 112 and the node controller directory cache 116 by enabling usage of spare processor identifiers (IDs) in the memory directory bits that are otherwise allocated for processors that are not implemented in the node. The spare processor IDs are used to further refine operations of the coarse directory cache 116 coupled to the node controller 114.

The spare bits in the memory directory 112 are redefined, then asserted and deasserted according to memory traffic and communicated to the node controller 114 to add to information in the node controller directory cache 116, thereby combining information in the directory cache 116 with information returning from the node 102 and appropriate processor 110.

For example, a standard off-the-shelf processor may have a directory that is only capable of tracking four processors according to the allocation in bits of the memory directory entry capacity of four bits. The illustrative structure and technique enables construction of a larger system with a substantially larger number of processors by redefining bits in the memory directory and adding a directory level in the node controller directory cache 116. In some embodiments, the node controller directory cache 116 can be a full directory that includes one entry for every line in memory on the processors 110 connected to the node controller 114 and can be inclusive so that no entries are evicted due to capacity fault. In other embodiments, the directory may be partial and/or may be exclusive with addition of some degree of complexity to caching operation.

Bits in the node controller directory cache entry 216 can be used in two ways. If the associated line has only one owner, the entry can be used as an 8-bit binary number identifying the owner since only a single owner is possible. If the associated line is shared, the entry can be used as a bit vector identifying which group of nodes has an entry. Typically, the memory may include bits that indicate whether a line is owned or shared.

In a particular embodiment, each group of sockets which are aggregated by the glue chip's directory cache 116 can be divided into two groups. For example referring to FIG. 2A, when a remote request is made and if requested from the group identified by bits C, the glue chip can make the request using a primary identifier (ID). If the remote request is made from the group identified by bits D, the glue chip can make the request using a spare ID, specifically an identifier for a non-existent cell local core.

In other configurations, the number of local and remote devices may be different. For example, a node with $N_L$ processors may include $N_L$ bits that identify the local processors. In a system with $N_R$ total remote processors, the memory directory entry may have M total bits so that the $N_R$ processors may be separated into $(M-N_L)$ groups. In other arrangements and embodiments, the bits may be allocated in different manners. For example, odd and even bits can respectively represent local and remote groups.

In general, the memory controller sets the remote group bits based on processor identifiers (IDs) used by the node controller to make a request. Similarly, the directory controller recalls from the $(M-N_L)$ groups according to the location from which a remote recall request is made.

When a recall is requested from the local cell and is made from the primary ID, then a first group is snooped and a second group is not snooped. Contrariwise, if a recall is requested from a remote cell and is made from a spare ID, the second group is snooped and the first group not snooped. The illustrative operation halves the number of remote snoops. Other embodiments may divide the cache into more groups, thereby reducing the number of snoops further.

Similarly, if a remote node requests recall of a line that the directory cache identifies as shared by one group of cells then the request is made on the primary ID. If the home cell then requests a recall from the spare ID, then the group of cells from which the recall is made is known. If the recall from the spare ID is from the primary ID, then the other group is also recalled. A third ID can be used to indicate that both groups are to be recalled.

The layering of directory information can be used to encode more complex information about additional cells and can be used to indicate whether both groups own a line.

In some arrangements, the controller can be configured for managing the node controller directory cache 116 as inclusive of the memory directories for the processor subset external to the node. Similarly, the controller can manage the node controller directory cache 112 as exclusive of the memory directories.

A controller can be configured to respond to a recall request issued by any processor in the system by issuing a recall to the processors in the system that have a line associated with the request that is dirty or shared.

In other circumstances and conditions, the controller can be configured to respond to a recall request from a remote node of a line that the node controller directory cache 116 identifies as shared by a first group of processors by directing the recall request according to a primary identifier. The controller can be further configured to respond to a subsequent recall request from a processor in a local node directed to a spare identifier by recalling the line from the first group and a second group.

Referring to FIGS. 3A through 3H, several flow charts depict various embodiments of a method for maintaining cache coherence. In one illustrative technique 300, shown in FIG. 3A, operations are coordinated 302 among multiple processors distributed among a plurality of nodes coupled by an interconnect fabric. Cache coherence is managed 304 using multiple memory directories respectively associated with the multiple processors in combination with a node controller directory cache associated with a node controller. The node controller manages traffic among the multiple processors and the interconnect fabric.

Memory coherence directory information is maintained 306 by identifying 308 processors within a node in a first portion of bits of a memory directory entry coupled to an associated processor in the node and identifying 309 subsets of processors external to the node in the system in a second portion of bits.

Figure 3A:
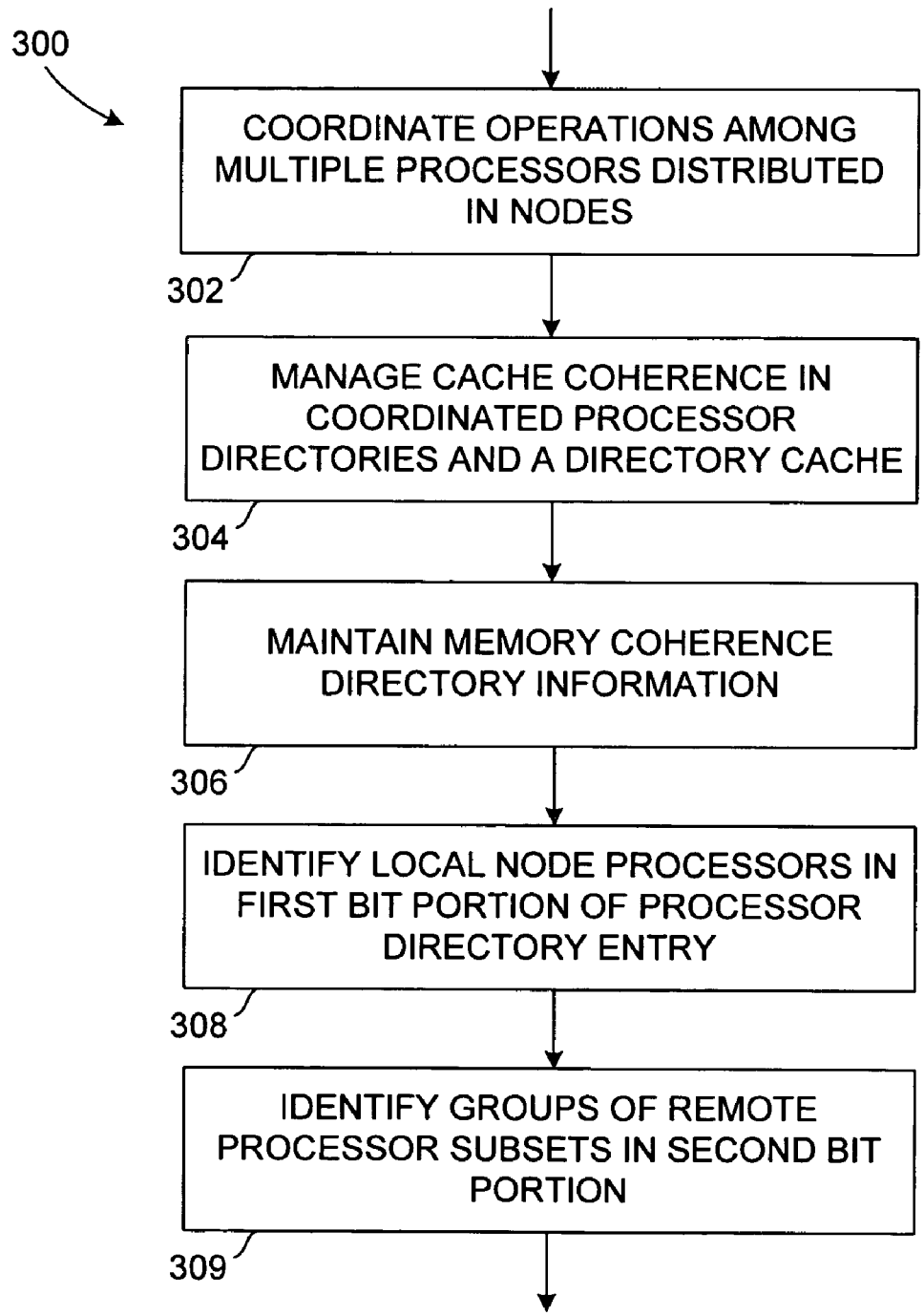
FIGS. 3A through 3H are flow charts depicting various embodiments of a method for maintaining cache coherence.
Figure 3B:
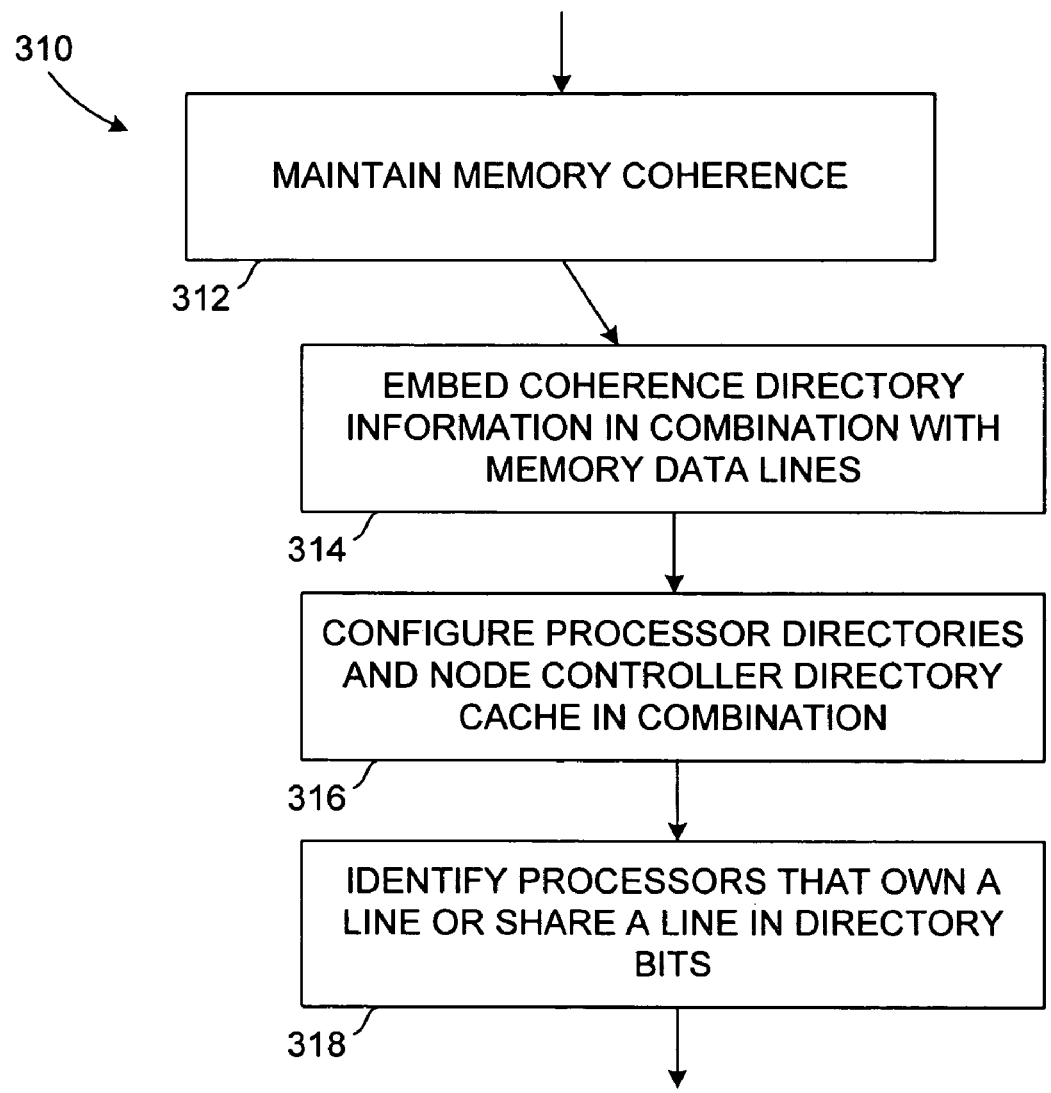

Referring to FIG. 3B, a method 310 for maintaining cache coherence can further comprise maintaining 312 memory coherence by embedding 314 coherence directory information in combination with data lines in a memory and configuring 316 the memory directories and the node controller directory cache in combination to facilitate look-up operations and protecting the processor plurality and busses from excessive snoop traffic. In a directory-based coherence scheme, processors are identified 318 that own a line and/or processors that share a line using bits in a memory directory entry.

Figure 3C:
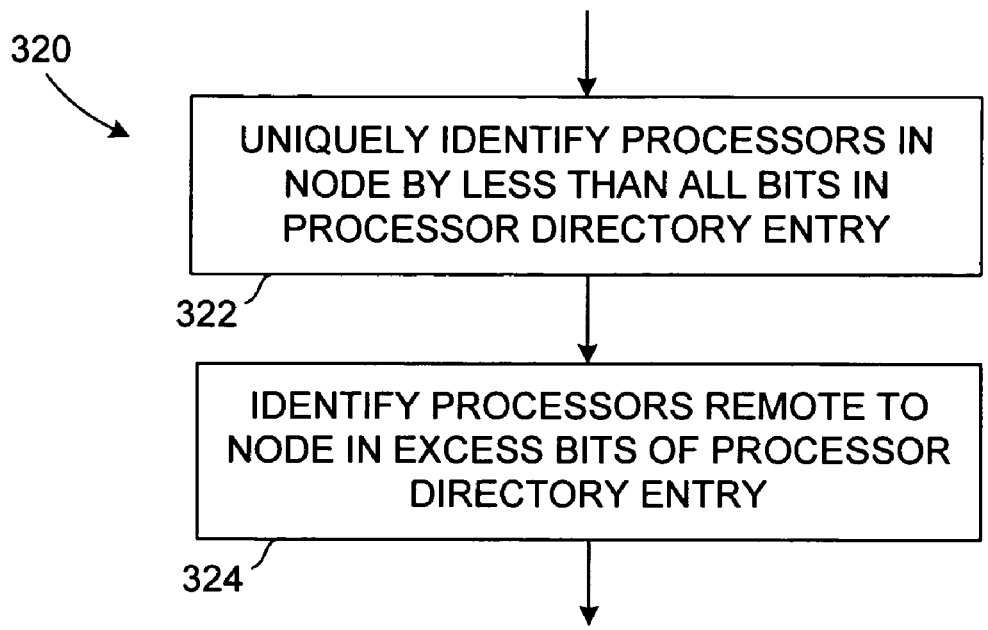

Referring to FIG. 3C, an embodiment of a method 320 for maintaining cache coherence can further comprise uniquely identifying 322 processors in a node by less than all bits in the memory directory entry for the associated processors. Subsets of processors external to the node can be identified 324 using bits in excess of the processor-identifying bits of the memory directory entry.

Figure 3D:
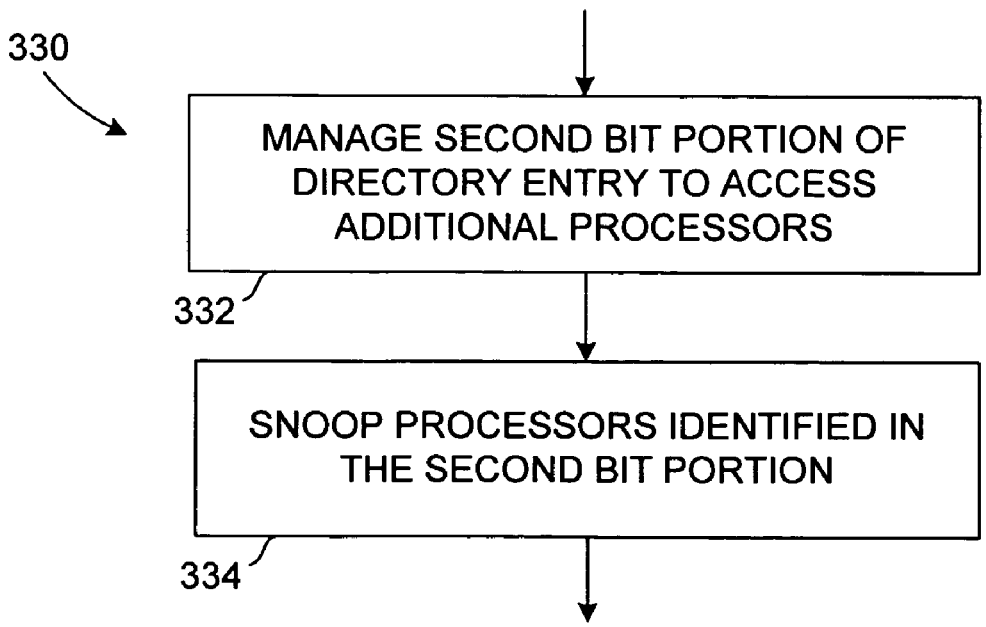

As shown in FIG. 3D, a method 330 can further comprise managing 332 the second bit portion in the memory directory entry to access more processors than can be uniquely identified by the memory directory entry bits and snooping 334 one or more processors identified by a bit in the second portion of the directory entry.

Figure 3E:
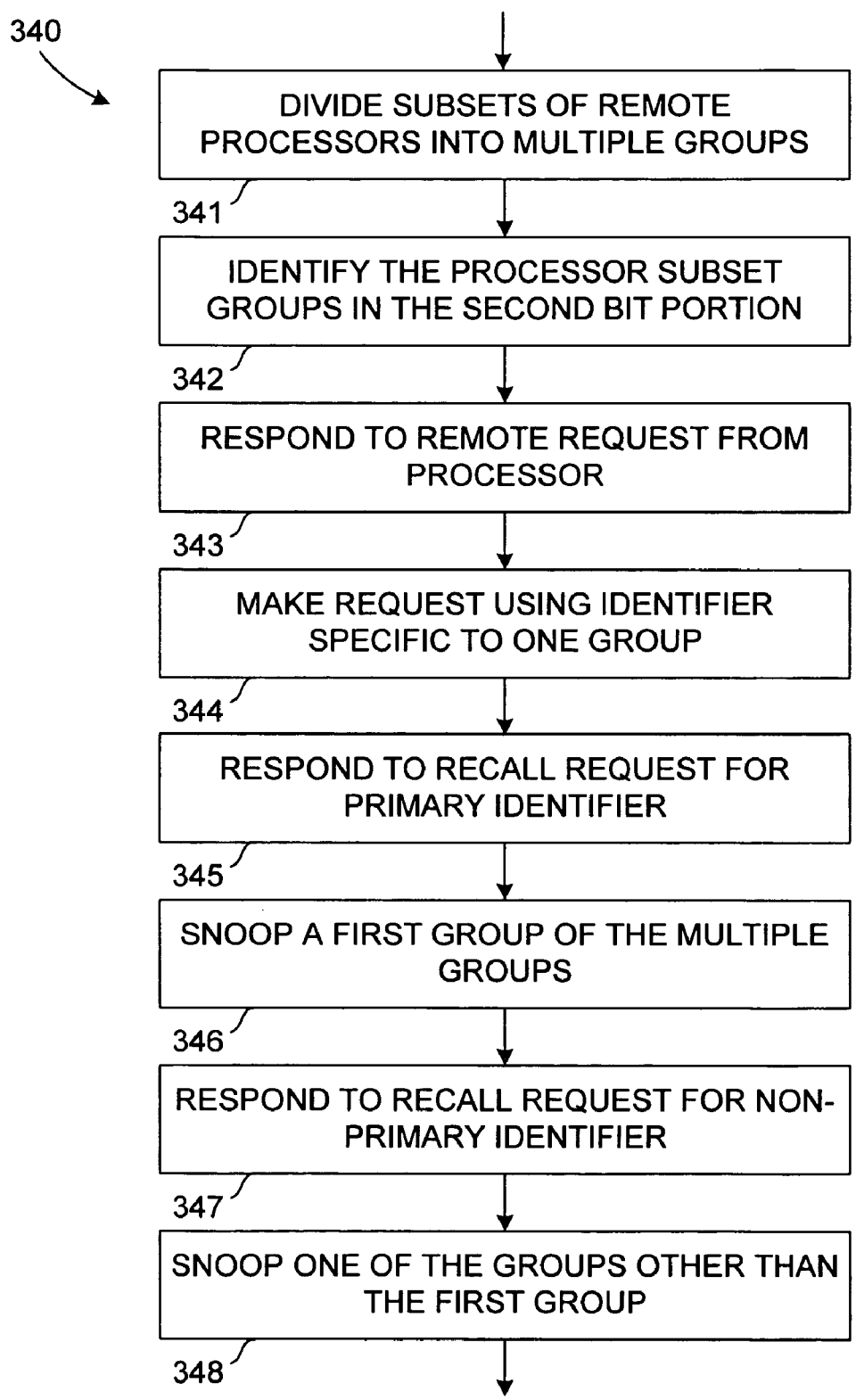

Referring to FIG. 3E, an embodiment of a method 340 for maintaining cache coherence can further comprise dividing 341 subsets of processors external to a local node into at least two groups and identifying 342 the processor subsets in the second bit portion of the memory directory entry. The technique can further comprise responding 343 to a remote request from a processor in one of the two or more groups by making 344 a request using an identifier specific to the one group. In some conditions, a system can respond 345 to a recall request for a primary identifier by snooping 346 a first group of the two or more groups alone. Also in some conditions, the system can respond 347 to a recall request for a non-primary identifier by snooping 348 a group of the two or more groups other than the first group.

Figure 3F:
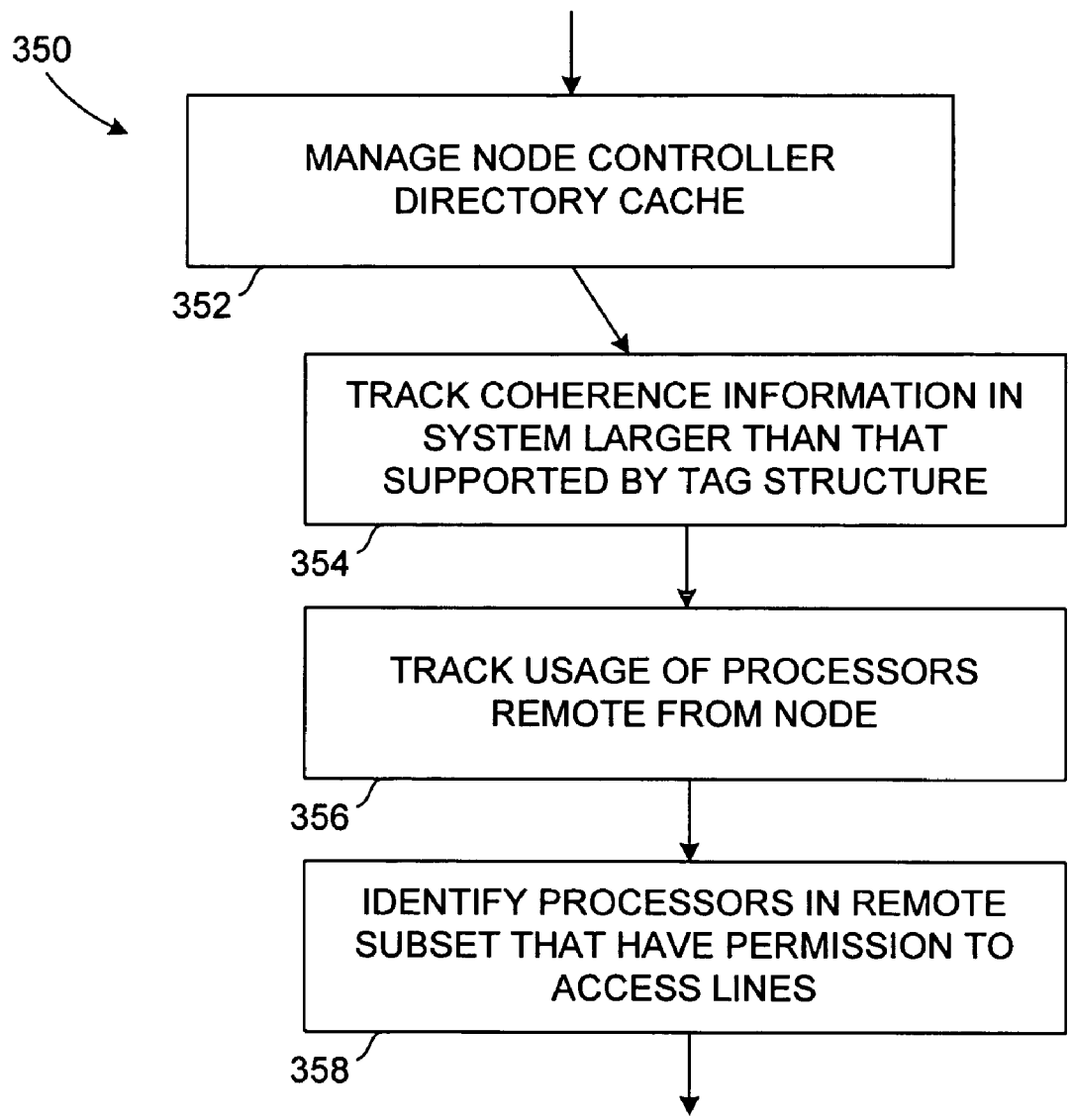

Referring to FIG. 3F, the illustrative method 350 can include operations for managing 352 the node controller directory cache comprising tracking 354 coherence information in the system that is larger than a directory supported by a processor local tag structure and tracking 356 usage of processors in the processor subset external to the node. Processors in the processor subset that have permission to access lines are identified 358.

Figure 3G:
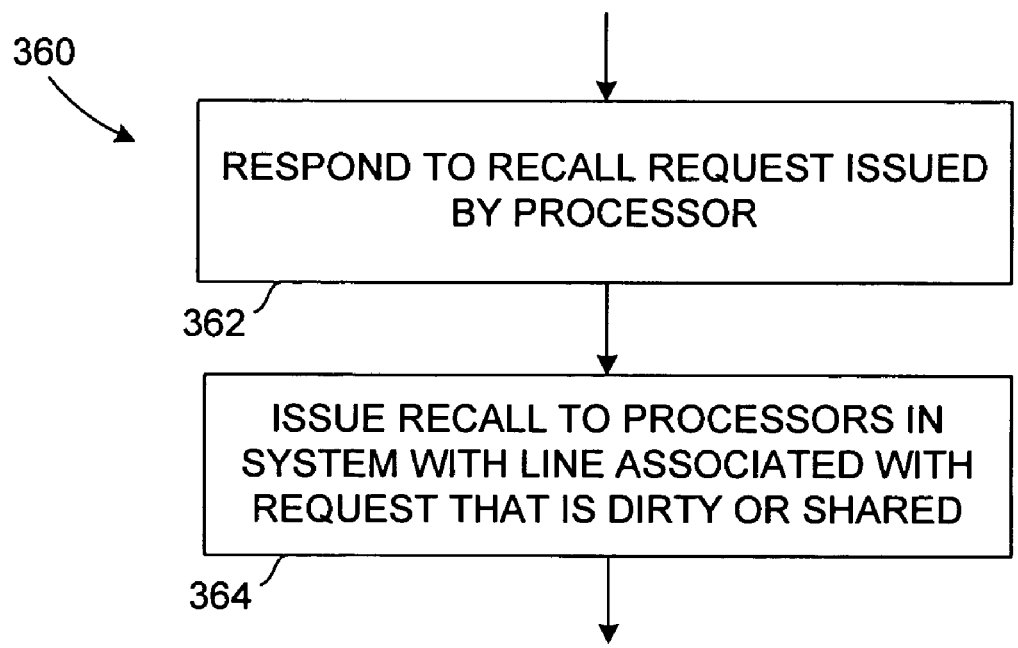

Referring to FIG. 3G, the method 360 can further respond 362 to a recall request issued by any processor in the system. The response 362 can comprise issuing 364 a recall to the processors in the system that has a line associated with the request that is dirty or shared.

Figure 3H:
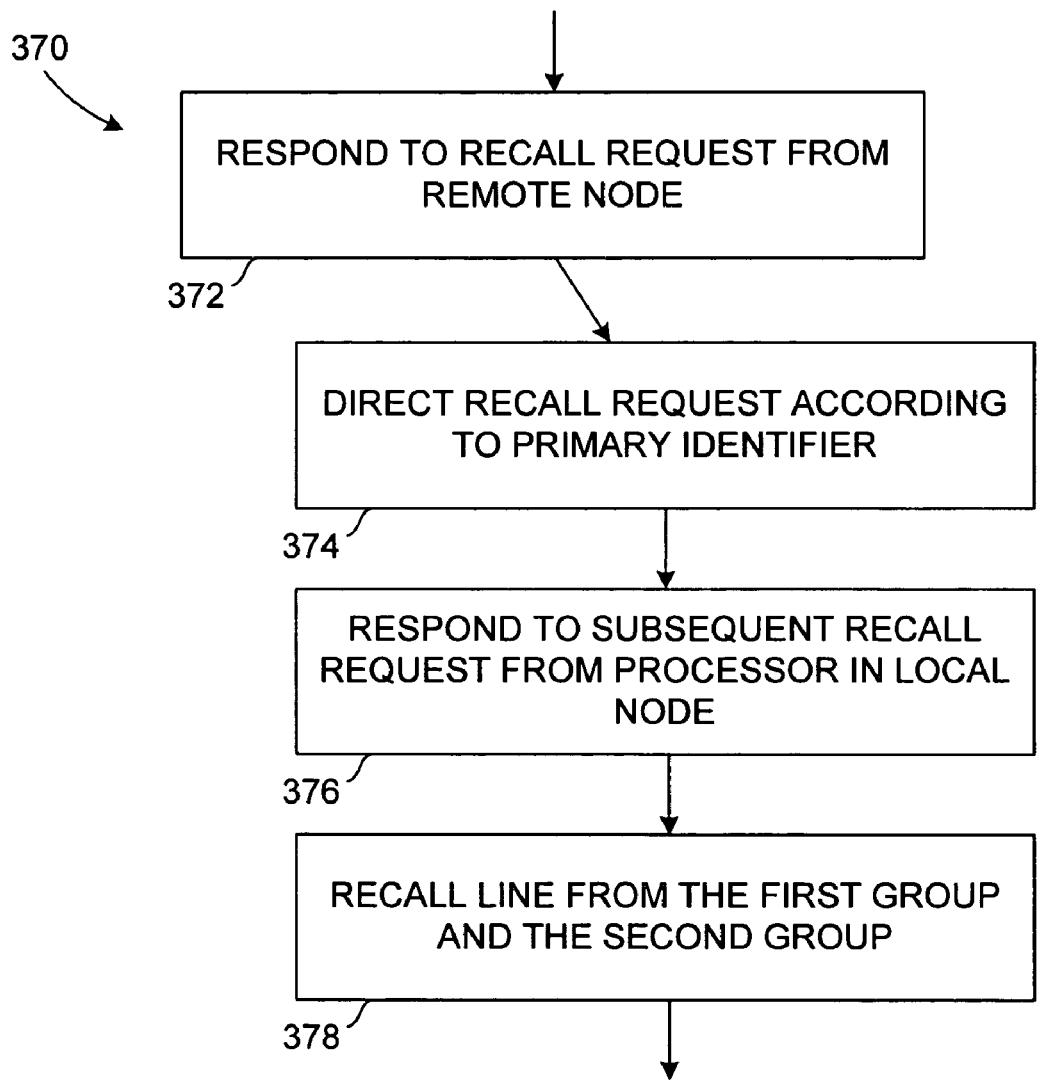

Referring to FIG. 3H, the method 370 can further respond 372 to a recall request from a remote node of a line that the node controller directory cache identifies as shared by a first group of processors by directing 374 the recall request according to a primary identifier. The technique further comprises responding 376 to a subsequent recall request from a processor in a local node directed to a spare identifier by recalling 378 the line from the first group and a second group.

Figure 4A:
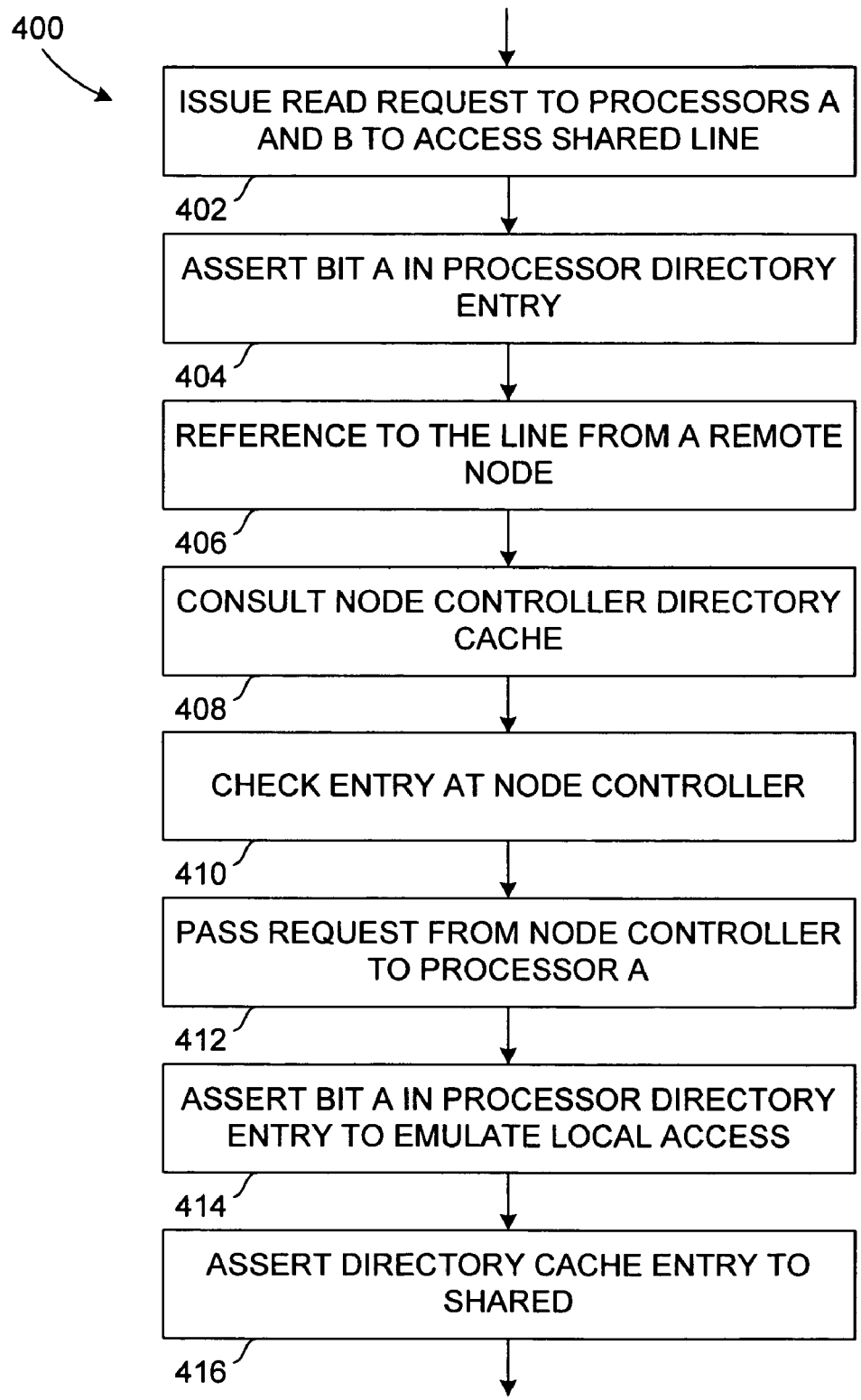
FIGS. 4A and 4B are flow charts showing an additional embodiment of a method for maintaining cache coherence.

Referring to FIG. 4A in combination with FIGS. 2A through 2C, a flow chart depicts another embodiment of a method for maintaining cache coherence using the illustrative directory structure. In an example configuration, the system may operate according to a MESI protocol. The MESI protocol for cache coherency and memory coherence supports both write-back and write-through caches wherein every cache line is marked with one of the four modified (M), exclusive (E), shared (S), and invalid (I) states encoded in two additional bits. In the modified (M) state the cache line is present only in the current state, is dirty, and is modified in comparison to the value in main memory. The cache is to write the data back to main memory before permitting any other read access of the no longer valid main memory state. In the exclusive (E) state, the cache line is present only in the current cache, is clear, and matches main memory. In the shared (S) state, the cache line may be stored in other caches. In the invalid (I) state, the cache line is invalid.

In the illustrative method 400, the local processor A issues 402 a read request to processor A and processor B to access a line that is shared. In the process of performing the request, bit A in the directory entry for processor A is asserted 404 with 1, meaning that the line is shared, in combination with setting of a shared bit in the memory for processor A. Thus, the shared bit is set and the directory for processor A has a copy of the line. The same conditions of assertion of the shared bit and the directory bit exist for processor B. If processor B reads the line from processor A, then the request bit in the directory for processor B bit is set. If a remote node references 406 the line, the node directory cache on the node controller is consulted 408 when the request passes through from the remote node. The node controller checks the entry 410 and passes 412 the request on to processor A, asserting 414 bit C in the memory directory entry as if the request were made from a local processor C, and asserting 416 the directory cache entry to shared.

Figure 4B:
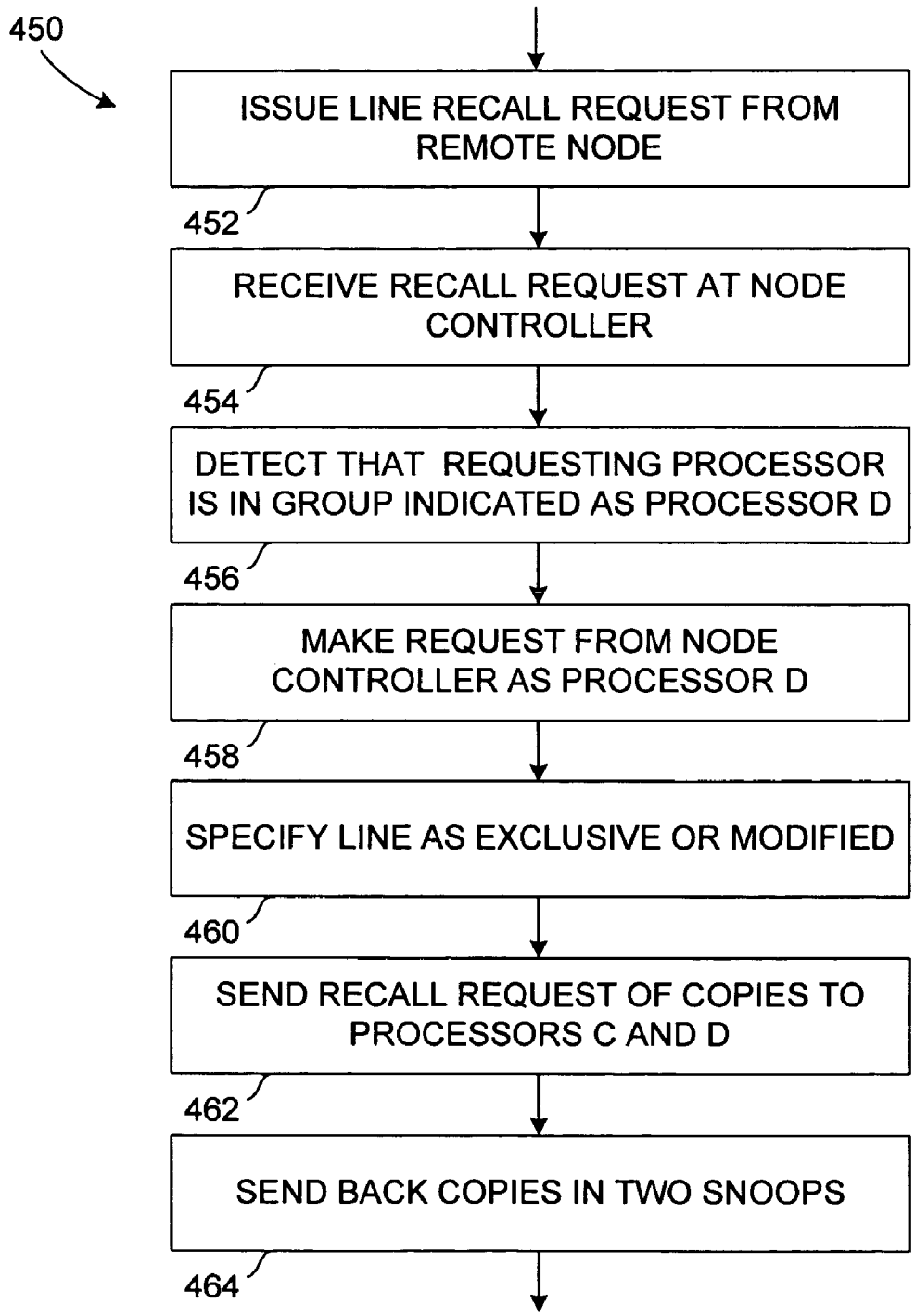

Referring to FIG. 4B in combination with FIGS. 2A through 2C, a flow chart depicts a further embodiment of a method 450 for maintaining cache coherence using the illustrative directory structure. A processor in a remote node can make a request 452 resulting in recall of one of the lines requested according to the method described by FIG. 4A. The remote processor makes the request 452 for ownership of the line so that other subsequent requesters would cede. The node controller receives 454 the request and detects 456 that the requesting remote processor is in a group that is emulated by the bit for processor D in the memory directory entry. The node controller makes the request 458 as processor D and specifies 460 that the line is exclusive (E) or modified (M). The node controller sends 462 a recall to processors C and D requesting copies of the line to be sent back. The remote processors corresponding to bits C and D send back 464 the copy, resulting in two snoops.

When the local processor is requested to recall a line, the operation is simpler. For example, local processor A requests to own the line by consulting the local memory directory and determining that processors indicated by bits C and D have copies. Processor A sends requests to the remote processors indicated by bits C and D. If bit C is asserted, the request is sent to the node controller which passes the request to the appropriate remote processor as indicated by bits 0-7 of the directory cache entry. Similarly, if bit D is asserted the request is sent to the node controller which passes the request to the appropriate remote processor as indicated by bits 8-15 of the directory cache entry. The process most effectively improves efficiency when most of the lines that are recalled are only shared with comparatively few processors or nodes of the first and second groups.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A system comprising:
a plurality of nodes coupled by an interconnect fabric, at least one of the node plurality comprising:
a plurality of processors respectively coupled to an associated plurality of memory directories; and
a node controller coupled to an associated node controller directory cache and coupled between the processor plurality and the interconnect fabric, the memory directory plurality and the node controller directory cache configured in combination for maintaining memory coherence directory information, a memory directory entry coupled to an associated processor in a node comprising a first portion of bits that identify processors within the node and a second portion of bits that identify subsets of processors external to the node in the system.

2. The system according to claim 1 further comprising:
a controller configured for executing a directory-based coherence scheme using bits in memory directory entries to identify processors that own a line and/or processors that share a line.

3. The system according to claim 1 further comprising:
a controller configured for managing the second bit portion in the memory directory entry to access more processors than can be uniquely identified by the memory directory entry bits of the second bit portion, the controller configured for snooping at least one processor identified by a bit in the second bit portion.

4. The system according to claim 1 further comprising:
a controller configured for managing the node controller directory cache to track coherence information in the system that is larger than a directory supported by a processor local tag structure, the controller to track usage of processors in a particular one of the processor subsets external to the node and to identify processors in the particular processor subset that have permission to access lines.

5. The system according to claim 4 further comprising:
the controller configured for managing the node controller directory cache as inclusive of the memory directories for the particular processor subset external to the node.

6. The system according to claim 4 further comprising:
the controller configured for managing the node controller directory cache as exclusive of the memory directories for the particular processor subset external to the node.

7. The system according to claim 1 further comprising:
a controller configured to respond to a recall request issued by any processor in the system by issuing a recall to the processors in the system that have a line associated with the request that is dirty or shared.

8. The system according to claim 1:
wherein the at least one node comprises a number of processors less than the number of processors that can be uniquely identified by bits in the memory directory entry for the associated processors wherein additional bits in the memory directory entry are used to identify subsets of processors external to the node.

9. The system according to claim 1 further comprising:
the second portion of bits to identify subsets of processors external to a local node divided into at least two groups;
a controller configured to respond to a remote request from a processor in one of the at least two groups by making a request using an identifier specific to the one group.

10. The system according to claim 1 further comprising:
a controller configured to respond to a recall request from a remote node of a line that the node controller directory cache identifies as shared by a first group of processors by directing the recall request according to a primary identifier, and further configured to respond to a subsequent recall request from a processor in a local node directed to a spare identifier by recalling the line from the first group and a second group of processors.

11. The system according to claim 1 further comprising:
a controller configured to maintain memory coherence by embedding coherence directory information in combination with data lines in a memory; and
the memory directory plurality and the node controller directory cache configured in combination for facilitating look-up operations, and protecting the processor plurality and busses from excessive snoop traffic.

12. A method for maintaining cache coherence comprising:
coordinating operations among a plurality of processors distributed among a plurality of nodes coupled by an interconnect fabric;
managing cache coherence using a plurality of memory directories respectively associated with multiple ones of the plurality of processors in a particular one of the nodes, in combination with a node controller directory cache associated with a node controller in the particular node coupled between the multiple processors and the interconnect fabric; and
maintaining memory coherence directory information comprising:

identifying the multiple processors within the particular node in a first portion of bits of a memory directory entry coupled to an associated processor in the particular node; and identifying subsets of processors external to the particular node in a second portion of bits of the memory directory entry.

13. The method according to claim 12 further comprising:
executing a directory-based coherence scheme; and
identifying processors that own a line and/or processors that share a line using bits in the memory directory entry.

14. The method according to claim 12 further comprising:
managing the second bit portion in the memory directory entry to access more processors than can be uniquely identified by the bits in the second bit portion; and
snooping at least one processor identified by a bit in the second bit portion.

15. The method according to claim 12 further comprising:
managing the node controller directory cache comprising:
tracking coherence information in a system including the plurality of nodes that is larger than a directory supported by a processor local tag structure;
tracking usage of processors in a particular one of the processor subsets external to the particular node; and
identifying processors in the particular processor subset that have permission to access lines.

16. The method according to claim 12 further comprising:
responding to a recall request issued by any processor in a system including the plurality of nodes;
issuing a recall to the processors in the system that have a line associated with the request that is dirty or shared.

17. The method according to claim 12 further comprising:
uniquely identifying the multiple processors in the particular node by less than all bits in the memory directory entry; and
identifying subsets of processors external to the node using bits in excess of the bits of the memory directory entry used to uniquely identify the multiple processors.

18. The method according to claim 12 further comprising:
dividing the subsets of processors external to the particular node into at least two groups;
responding to a remote request from a processor in one of the at least two groups by making a request using an identifier specific to the one group.

19. The method according to claim 12 further comprising:
responding to a recall request from a remote node of a line that the node controller directory cache identifies as shared by a first group of processors by directing the recall request according to a primary identifier; and
responding to a subsequent recall request from a processor in the particular node directed to a spare identifier by recalling the line from the first group and a second group.

20. The method of claim 12, wherein the first portion of bits identify corresponding ones of the multiple processors within the particular node that has a copy of a corresponding cache line.

21. A computer readable storage medium having a computable readable program code embodied therein for maintaining cache coherence, the computable readable program code comprising:
a code adapted to cause a controller to coordinate operations among a plurality of processors distributed among a plurality of nodes coupled by an interconnect fabric;
a code adapted to cause the controller to manage cache coherence in a plurality of memory directories respectively associated with multiple ones of the plurality of processors in a particular one of the nodes, in combination with a node controller directory cache associated with a node controller in the particular node coupled between the multiple processors and the interconnect fabric;
a code adapted to cause the controller to maintain memory coherence directory information;
a code adapted to cause the controller to identify the multiple processors within the particular node in a first portion of bits of a memory directory entry coupled to an associated processor in the particular node; and
a code adapted to cause the controller to identify subsets of processors external to the particular node in a second portion of bits of the memory directory entry.

22. The system of claim 1, wherein the first portion of bits identify corresponding ones of the processors within the node that has a copy of a corresponding cache line.

23. A computer readable storage medium of claim 21, wherein the first portion of bits identify corresponding ones of the multiple processors within the particular node that has a copy of a corresponding cache line.

* * * * *